United States Patent
Sievers et al.

[11] Patent Number: 5,998,728
[45] Date of Patent: Dec. 7, 1999

[54] IONICALLY INSULATING SEAL FOR ALKALI METAL THERMAL TO ELECTRIC CONVERSION (AMTEC) CELLS

[75] Inventors: Robert K. Sievers; Thomas Kintzing Hunt, both of Ann Arbor, Mich.

[73] Assignee: Advanced Modular Power Systems, Inc., Ann Arbor, Mich.

[21] Appl. No.: 08/861,123

[22] Filed: May 21, 1997

[51] Int. Cl.$^6$ ................................................. H01L 35/30
[52] U.S. Cl. ...................... 136/205; 136/242; 136/201; 429/104; 429/112
[58] Field of Search ................................. 136/200, 202, 136/205, 207, 208, 209, 242; 429/5, 11, 50, 104, 112, 120

[56] References Cited

U.S. PATENT DOCUMENTS

| | | | |
|---|---|---|---|
| 4,048,393 | 9/1977 | Heintz et al. | 429/104 |
| 4,215,466 | 8/1980 | Bindin | 29/623.2 |
| 4,530,151 | 7/1985 | Kagawa et al. | 29/623.1 |
| 4,661,424 | 4/1987 | Matsui et al. | 429/104 |
| 4,857,421 | 8/1989 | Ernst | 429/104 |
| 5,118,574 | 6/1992 | Bindin et al. | 429/104 |
| 5,158,839 | 10/1992 | Wright | 429/103 |
| 5,194,337 | 3/1993 | Yoshida et al. | 428/426 |
| 5,228,922 | 7/1993 | Sievers | 136/202 |

OTHER PUBLICATIONS

S. Sherrit, M. Sayer and B. Kindl, "Electrode Systems and Heat Transfer in Thermoelectric Generator Design", Proceedings of the 23rd Intersociety Energy Conversion Engineering Conference, vol. 1, pp. 241–247, 1988, no month given.

D.M. Ernst, "A Capillary Pumped SHE/AMTEC System", Transactions of the 5th Symposium on Space Nuclear Power Systems, Albuquerque, NM (1988) pp. 619–620, no month given.

*Primary Examiner*—Kathryn Gorgos
*Assistant Examiner*—Thomas H. Parsons
*Attorney, Agent, or Firm*—Harness, Dickey, & Pierce P.L.C.

[57] ABSTRACT

The present invention provides an ionic and electronic insulator interposed between a BASE tube and a tube mounting member in an AMTEC cell for preventing shunt currents from forming between BASE tube electrodes. In a first embodiment of the invention, an insulator is formed integral with the BASE tube by leaching out an alkali metal ion component of the BASE tube at a desired location. In a second embodiment of the present invention, an alpha alumina ring is brazed to the end of the BASE tube. In a third embodiment of the present invention, a glass material seal is formed between the BASE tube and the mounting member.

15 Claims, 2 Drawing Sheets

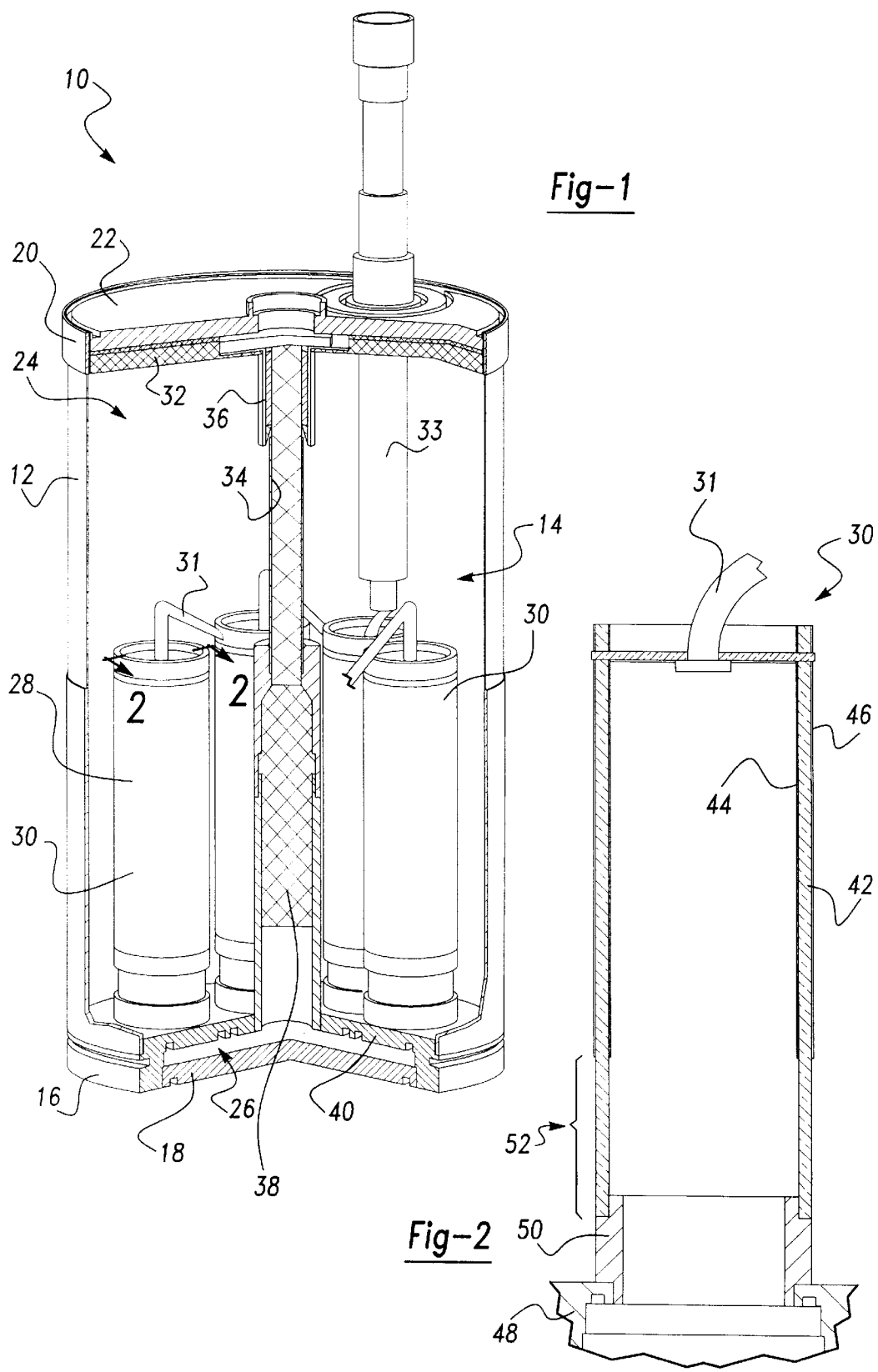

IONICALLY INSULATING SEAL FOR ALKALI METAL THERMAL TO ELECTRIC CONVERSION (AMTEC) CELLS

BACKGROUND OF THE INVENTION

1. Technical Field

The present invention generally relates to alkali metal thermal to electric conversion (AMTEC) cells and more particularly to means for reducing or eliminating undesirable shunt currents in solid electrolyte structures.

2. Discussion

An AMTEC cell is a thermally regenerative concentration cell typically utilizing sodium or potassium as a working fluid and a beta-alumina type solid electrolyte as an ion selective membrane. The electrolyte permits a nearly isothermal expansion of sodium to generate high-current/low voltage power at high efficiency. Most AMTEC cells employ at least one beta-alumina type solid electrolyte (BASE) element which is exposed to high-pressure sodium on an inner surface and low-pressure sodium on an outer surface.

The BASE element's inner and outer surfaces are overlaid with permeable electrodes which are connected to each other through an external load circuit. Neutral sodium atoms incident on the BASE element's inner surface give up their electrons at the inner electrode (the anode). The resulting sodium ions pass through the tube wall under the applied pressure gradient, and the emerging sodium ions are neutralized at the outer electrode (the cathode) by electrons returning from the external load. Thus, the pressure gradient drives sodium through the base element thereby creating an electrical current which passes through the external load resistance.

Early AMTEC cells employed a single BASE tube with liquid sodium on the high-pressure side of the tube and sodium vapor on the low-pressure side. The pressure differential drove the sodium ions through the ionically conductive BASE tube wall. Recently, however, it has been determined that under many circumstances, AMTEC cell efficiency can be significantly improved and output voltage enhanced by employing multiple BASE tubes connected in series.

Commonly, each of the several BASE tubes in a cell is series-connected to an adjacent tube by an external load circuit at its upper end. The top of each cell's outer electrode is connected to the top of the next tube's inner electrode. As such, the resulting multi-tube cell only requires a single terminal lead and feed-through.

Multi-tube cells use sodium vapor on both sides of the tube wall in an effort to prevent shorting of the BASE tubes within each cell. The inner surface of the BASE tubes is exposed to high-pressure sodium vapor and the outer surface is exposed to low-pressure sodium vapor. A high temperature evaporator near the hot end of the cell produces the high pressure and a low temperature condenser at the cold end of the cell produces the low-pressure.

By connecting BASE tubes in series within a single cell chamber, an increased voltage is applied to each downstream tube in the series string. It has now been found that this leads to the presence of an undesirable shunt current between the electrodes of some of the BASE tubes and the cell ground. The shunt current degrades the overall voltage of the string and lowers the power output of the cell.

It has now been found that the shunt current occurs due to the conduction of alkali metal ions through the BASE tube inner electrode to a conductive mounting bracket which interconnects the BASE tube and the bottom of the cell. To prevent this from occurring it is desirable to form an ionically and electronically insulating layer between the BASE tube and the mounting bracket so as to produce a connection which will not support an alkali metal ion current.

SUMMARY OF THE INVENTION

The above and other objects are provided by interposing an ionic and electronic insulator between the BASE tube and the BASE tube mounting member. In a first embodiment of the invention, an insulator is formed integral with the BASE tube by leaching out an alkali metal ion component of the BASE tube at a desired location. In a second embodiment of the present invention, an alpha alumina ring is brazed to the end of the BASE tube. In a third embodiment of the present invention, a glass material seal is formed between the BASE tube and the mounting member.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a perspective view in partial cross-section of an AMTEC cell in accordance with the teaching of the present invention;

FIG. 2 is a cross-sectional view of a BASE tube employing an ionically insulating layer formed integral with the BASE tube in accordance with the present invention;

DETAILED DESCRIPTION OF THE PREFERRED EMBODIMENTS

Figure 3:
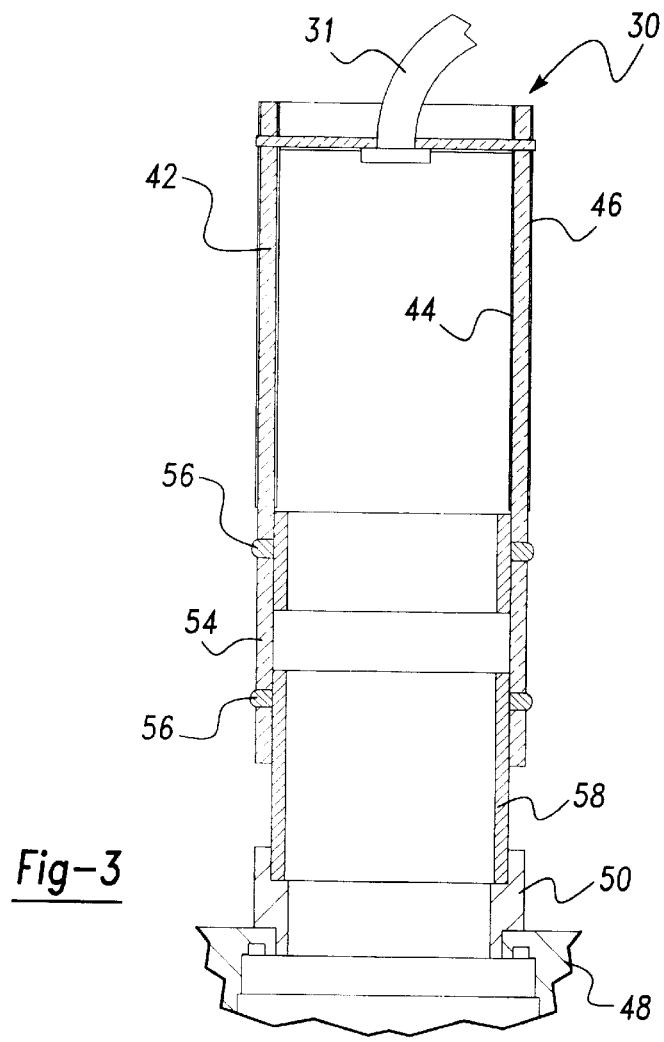
FIG. 3 is a cross-sectional view of a BASE tube incorporating a ceramic insulator brazed to the BASE tube in accordance with the present invention.

The present invention is directed towards a means for insulating series connected BASE tubes of an AMTEC cell from their mounting brackets and the bottom of the cell. This may be accomplished by an ionically and electronically insulating portion integrally formed in the BASE tube wall, a discrete alpha alumina ring interposed between the BASE tube wall and the mounting bracket or a glass seal formed between the tube wall and mounting bracket. In each embodiment, undesirable shunt currents are prevented from forming between the electrodes of the BASE tubes and the cell ground. As such, the voltage of the BASE tube series string is optimized and the cell power output is enhanced.

Turning now to the figures, an AMTEC cell 10 incorporating the teachings of the present invention is illustrated in FIG. 1. The AMTEC cell 10 includes a cell wall 12 defining a chamber 14 which is closed at a first end 16 by a first end cap 18. The first end 16 is generally known in the art as the hot end of the cell 10. The chamber 14 is also closed at a second end 20 by a second end cap 22. The second end 20 is generally known in the art as the cold end of the cell 10.

The chamber 14 is separated into a low-pressure zone 24 and a high pressure zone 26 by a solid electrolyte structure 28. In the illustrated embodiment, the solid electrolyte structure 28 includes a plurality of beta-alumina solid electrolyte (BASE) tubes 30 electrically connected in series by an external load circuit 31. The circuit 31 is coupled to a terminal 33 projecting exterior of the cell 10 to allow power output from the cell. Although the BASE tubes 30 are shown, it is to be understood that the present invention is also suitable for use in conjunction with solid electrolyte structures of other configurations such as flat plate bi-polar stacks.

A condenser 32 is disposed in, and therefore communicates with, the low-pressure zone 24. As can be seen, the condenser 32 is coupled to the cell wall 12 about its periphery adjacent the second end cap 22. An artery return channel 34 packed with metallic felt, is coupled to the condenser 32 by a mounting member 36. The return channel 34 extends from the condenser 32 through the low-pressure zone 24 towards the hot end 16 of the cell 10.

The return channel 34 is connected to an evaporator 38 which communicates with the high-pressure zone 26. A common plenum 40 adjacent the hot end 16 of the cell 10 interconnects the evaporator 38 and the high-pressure side of the solid electrolyte structure 28. An alkali metal working fluid, such as sodium, is disposed within the cell 10.

In operation, neutral sodium atoms incident on the high pressure side of the electrolyte structure 28 release their electrons to an inner electrode. The resulting sodium ions pass through the solid electrolyte structure 28 under an applied pressure gradient and the emerging sodium vapor ions are neutralized at an outer electrode by electrons returning from the external load. The neutral sodium atom vapor leaving the outer electrode migrates through the low-pressure zone 24 and condenses at the condenser 32. The sodium condensate flows downward through the return channel 34 to the evaporator 38. The liquid sodium evaporates at the evaporator 38 and the high-pressure sodium vapor is returned to the high-pressure side of the solid electrolyte structure 28 through the plenum 40.

Referring now also to FIG. 2, each BASE tube 30 includes a wall 42, which, under a suitable pressure gradient conducts sodium ions but not neutral sodium atoms. The inner surface of each BASE tube 30 is covered with a porous electrode 44, commonly the anode. Similarly, the outer surface of each BASE tube 30 is covered with a porous electrode 46, commonly the cathode. Each anode 44 is connected to the cathode 46 of an adjacent BASE tube 30 through the internal series circuit 31. As such, neutral sodium atoms incident on the inner surface of the tube 30 give up their electrons at the anode 44, enter the BASE tube walls as sodium ions and pass through the tube wall 42 under the applied pressure gradient. The emergent sodium ions are neutralized at the cathode 46 by electrons returning from the external load (not shown).

As can be seen in FIG. 2, the BASE tube 30 is connected to a tube support plate 48 by a metallic, or otherwise conducting, mounting bracket 50. Therefore, without implementation of the present invention, a shunt current could form between the BASE tube 30 and the mounting bracket 50 or tube support plate 48. To prevent this, a portion of the BASE tube 30, generally indicated at 52, has been denatured to render it ionically and electronically insulating. Preferably, this is done by leaching out the alkali metal ion component of the BASE tube 30 at a preselected location, such as 52. By forming the insulator 52, the connection between the BASE tube 30 and the mounting bracket 50 will not support an alkali metal ion current. This prevents shunt currents from forming between the anode 44 and the mounting bracket 50. Advantageously, the ionically and electronically insulating portion 52 of the first embodiment is formed integral with the remainder of the BASE tube 30. This reduces the cost of forming a discrete insulation barrier between the BASE tube 30 and the mounting bracket 50 and also reduces the number of interfaces and the potential for failure/vacuum leakage from the BASE tube 30.

To produce the ionically and electronically insulating portion 52 of the BASE tube 30, the surface to which the mounting bracket 50 is to be joined is treated to leach out the alkali metal ion component of the BASE tube 30 rendering the treated area an ionic and electronic insulator. To accomplish this, the desired portion 52 of the BASE tube 30 may be etched with an aqueous acid solution to extract the metal oxide and render the material ionically insulating. Alternatively, the desired portion 52 of the BASE tube 30 may be treated with carbon and heated in a vacuum to a temperature of approximately 700°–1000° C. for a period of 0.5–2 hours. Under these conditions, the carbon reacts with oxygen in the BASE tube 30 reducing the alkali metal oxide to its oxide-free alkali metal constituent. A third option is to heat the desired portion 52 to a high temperature (such as 1300° C. for a period of 0.5–2 hours) in a vacuum to drive off the metal oxide. A fourth option is to effect the reduction in the ionic conductivity of the desired portion by exchanging less mobile ions such as calcium, strontium, scandium, or yttrium for the highly mobile alkali metal ions with which the device operates. With the exchange in place, a second effect aiding the ionic conduction isolation process is the formation of a zone in which the well known "mixed alkali effect" reduces the ionic conductivity of beta alumina type electrolytes below that of either beta-alumina phase alone. In each case, the resulting portion 52 is no longer a good ionic conductor since it lacks the proper alkali metal oxide. Of the above-mentioned methods, it is presently preferred to use the acid etch approach with sulfuric acid at a moderate temperature, typically in the range of 50°–125° C.

Referring now to FIG. 3, a second embodiment of the present invention is illustrated. In this embodiment, a discrete ceramic insulator 54, such as an alpha-alumina ring, is brazed to the end of the BASE tube 30. To accomplish this, a pair of tantalum rings 56 are brazed between the insulator 54 and the tube 30. Also, a sleeve 58 extends between the insulator 54 and the mounting bracket 50. As illustrated, the conductive path for the shunt current, without the insulator 54, would be from the anode 44, through the sleeve 58 and to the mounting bracket 50. However, by inserting the insulator 54 therein, the conductive path is broken. It should be noted that this illustration emphasizes that the present invention is directed towards the prevention of shunt currents leaking from the BASE tube 30 to the bottom of the cell regardless of the particular mounting method employed. As depicted, the insulator 54 is effective for this purpose and is also simple to produce. It should also be noted that the height of the insulator 54 (or insulator 52 of FIG. 2) is dependent on the thermal conductive properties of the cell 10. A longer insulator provides a longer path for conductance and thus higher resistivity. It has been found that a resistance in the range of 10–20 ohms is suitable for most applications. The length of the insulator may also prevent surface conduction which may result due to the presence of the sodium vapor.

Figure 4:
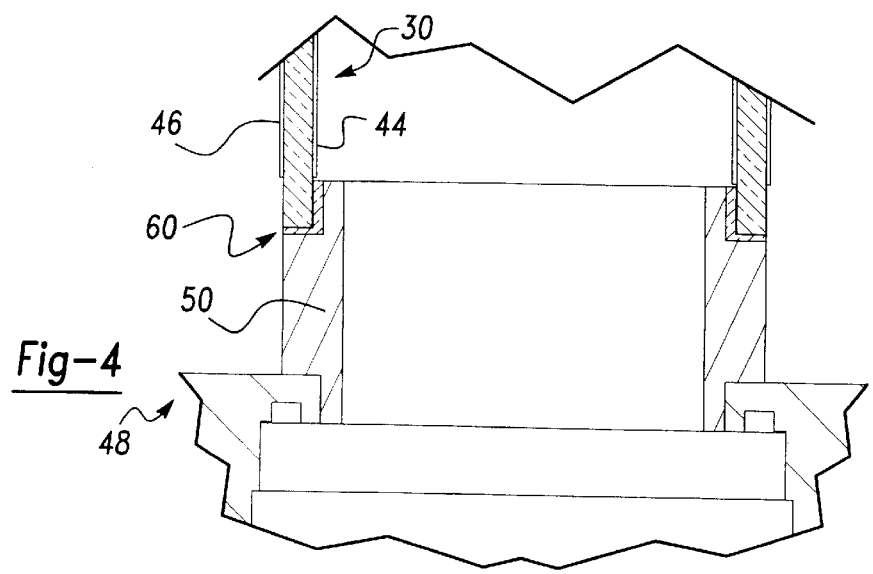
FIG. 4 is an enlarged cross-sectional view of a glass seal interposed between a BASE tube and mounting bracket in accordance with the present invention.

Turning now to FIG. 4, a third embodiment of the present invention is shown. In this embodiment, an ionically and electrically insulating seal 60 consisting of a glass or glass-ceramic material is formed between the BASE tube 30 and the mounting bracket 50. To form the seal 60, glass material is ground into a moderately fine powder and applied to the interface between the BASE tube 30 and the mounting bracket 50 using a polymer adhesive. Preferably, the adhesive leaves no residue upon decomposing at high temperatures in a vacuum or inert gas environment. Acrylic materials, meet this requirement. Also, use of high temperature sealing glasses or glass ceramics such as calcium aluminate is preferred.

The glass-ceramic seal 60 provides an ionically and electronically insulating barrier which is resistant to alkali metal ion conduction at 850° C. and adherent to the BASE tube as well as to the refractory metals typically found in mounting bracket 50 and sleeves 58 (FIG. 3). The seal 60 exhibits heightened durability when the thermal expansion coefficient of the glass, mounting bracket and BASE tube 30 are well matched. In this embodiment, the seal 60 provides both the mechanical connection and the ionic conductor insulation required to enable series connection between BASE tubes 30 without significant losses due to leakage currents.

Thus, the present invention prevents shunt currents from forming between the electrodes of the BASE tubes. To accomplish this, the ionic insulator interposed between the BASE tubes and mounting members prevents the conduction of alkali metal ions from the BASE tubes to the bottom of the cell. As such, the voltage of the BASE tube series string is optimized and the cell power output is enhanced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An alkali metal thermal to electric conversion (AMTEC) cell employing an alkali metal flowing between a hot end of the cell and a cold end of the cell, said cell comprising:

a condenser communicating with a low-pressure zone of said cell for condensing alkali metal vapor migrating through said low-pressure zone;

a return channel extending from said condenser for directing said condensed alkali metal from said condenser toward said hot end of said cell;

an evaporator coupled to said return channel and communicating with a high-pressure zone for evaporating said condensed alkali metal into said high-pressure zone;

a solid electrolyte structure separating said cell into said low-pressure zone and said high-pressure zone;

a mounting member supporting said solid electrolyte in said cell;

an insulator disposed between said solid electrolyte structure and said mounting member for preventing the conduction of alkali metal ions through said solid electrolyte structure to said electrolyte structure mounting member; and wherein said insulator further comprises a preselected portion of said solid electrolyte structure depleted of an alkali metal ion component to prevent the conduction of alkali metal ions through said electrolyte structure to said mounting member.

2. The cell of claim 1 wherein said solid electrolyte structure further comprises at least one tube-shaped structure member separating said cell into said low-pressure zone and said high-pressure zone.

3. The cell of claim 1 wherein said solid electrolyte structure further comprises a plurality of solid electrolyte tubes separating said cell into said low-pressure zone and said high-pressure zone.

4. The cell of claim 1 wherein said solid electrolyte structure further comprises a beta-alumina type material.

5. The cell of claim 1 wherein said solid electrolyte structure is brazed to said mounting member.

6. The cell of claim 1 further comprising a mechanical fastener interengaging said solid electrolyte structure and said mounting member.

7. An alkali metal thermal to electric conversion (AMTEC) cell employing an alkali metal flowing between a hot end of the cell and a cold end of the cell, said cell comprising:

a condenser communicating with a low-pressure zone of said cell for condensing alkali metal vapor migrating through said low-pressure zone;

a return channel extending from said condenser for directing said condensed alkali metal from said condenser toward said hot end of said cell;

an evaporator coupled to said return channel and communicating with a high-pressure zone for evaporating said condensed alkali metal into said high-pressure zone;

a solid electrolyte structure including a plurality of beta-alumina type solid electrolyte tubes separating said cell into said low-pressure zone and said high-pressure zone;

a mounting member coupled to said solid electrolyte structure for supporting said solid electrolyte structure within said cell; and an insulator consisting of a pre-selected portion of said solid electrolyte structure depleted of an alkali metal ion component disposed between the remaining solid electrolyte structure and said mounting member for preventing the conduction of alkali metal ions from said remaining solid electrolyte structure to said mounting member.

8. The cell of claim 7 wherein said mounting member further comprises a plurality of mounting rings, each ring being connected at a first end to one of said beta-alumina type solid electrolyte tubes and at a second end to a tube support plate disposed within said cell proximate said hot end and further separating said cell into said low-pressure zone and said high-pressure zone.

9. The cell of claim 7 wherein said pre-selected portion of said solid electrolyte structure further comprises an integral ring of each of said beta-alumina type solid electrolyte tubes adjacent said mounting members depleted of said ion metal component such that said portion is rendered non-ion conductive.

10. A method of preventing undesired shunt currents from forming an alkali metal thermal to electric conversion (AMTEC) cell having an alkali metal flowing through a beta-alumina type solid electrolyte structure separating said cell into a low-pressure zone and a high-pressure zone, said method comprising:

selecting a desired portion of said solid electrolyte structure; and treating said desired portion of said solid electrolyte structure to leach out an alkali metal ion component of said beta-alumina to render said desired portion ionically insulating such that alkali metal ions are prevented from conducting from a non-treated portion of said solid electrolyte structure to cell ground.

11. The method of claim 10 wherein said leaching out step further comprises:

reacting carbon with an oxide component of said solid electrolyte structure to reduce said desired portion to its oxide-free alkali metal constituent.

12. The method of claim 10 wherein said leaching out step further comprises:

etching said desired portion of said solid electrolyte structure with an acid to extract a metal oxide component from said solid electrolyte structure.

13. The method of claim 10 wherein said leaching out step further comprises:

driving off a metal oxide component from said desired portion of said solid electrolyte structure by heating said desired portion in vacuum to a preselected high temperature for a preselected time.

14. The method of claim 10 wherein said leaching-out step further comprises:

exchanging alkali metal ions at said desired portion of said solid electrolyte structure with less mobile ions.

15. The method of claim 14 wherein said less mobile ions are selected from the group consisting of calcium, strontium, scandium, yttrium, and combinations thereof.

* * * * *